C. P. LANDRETH.
PROCESS OF TREATING LIQUIDS.
APPLICATION FILED AUG. 2, 1912.
1,146,942.
Patented July 20, 1915.
3 SHEETS—SHEET 2.
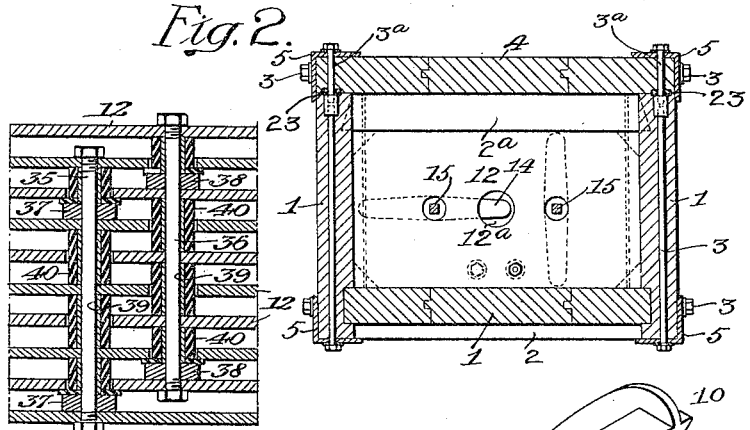
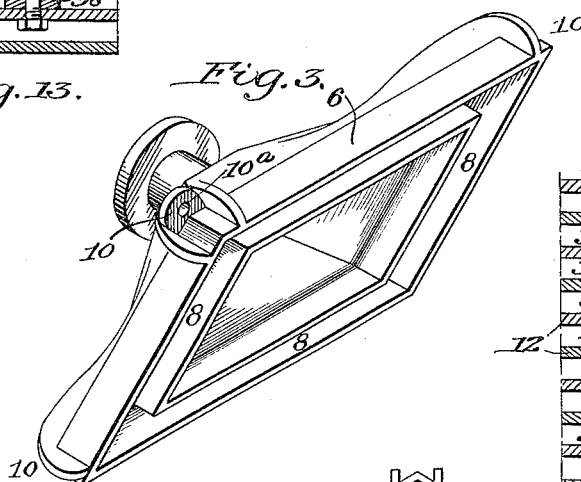
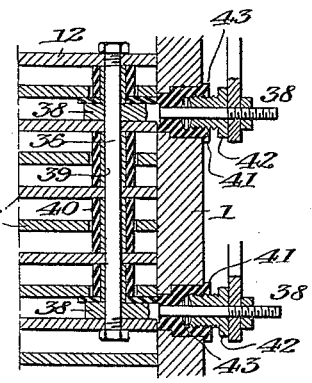
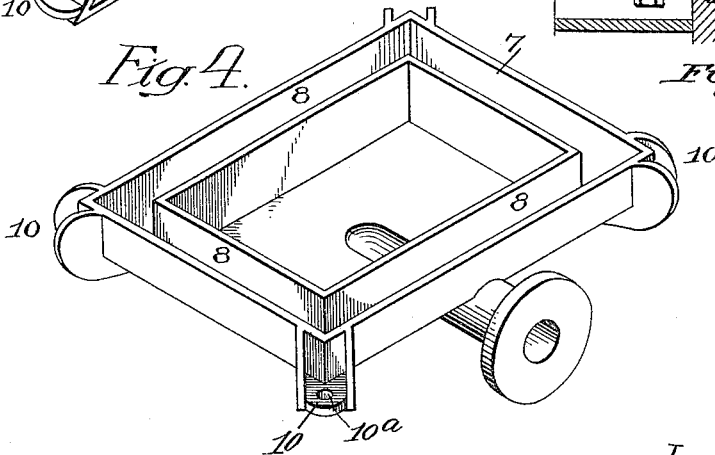
Witnesses:
Inventor
Clarence P. Landreth
by his Attorneys
Howson & Howson

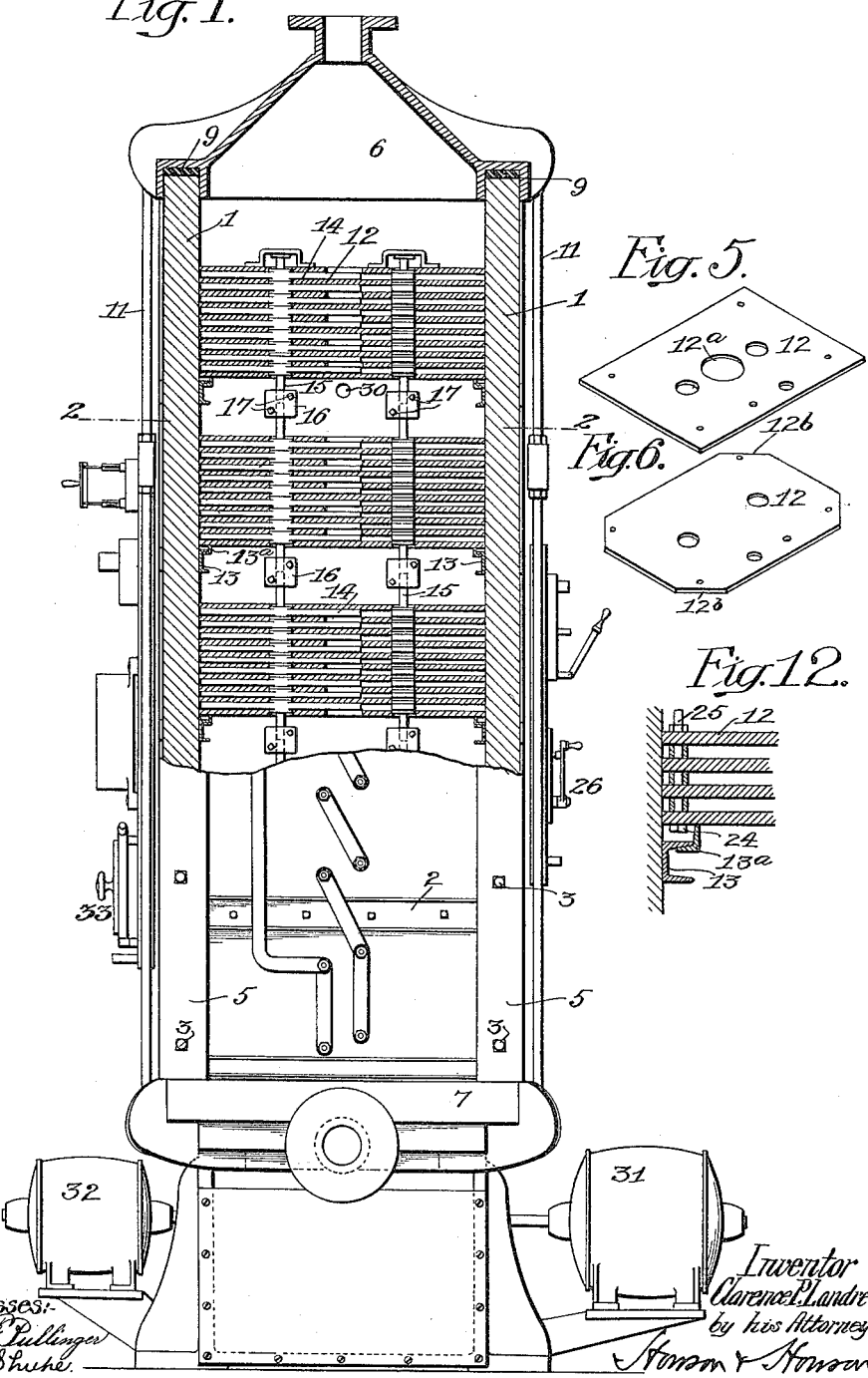

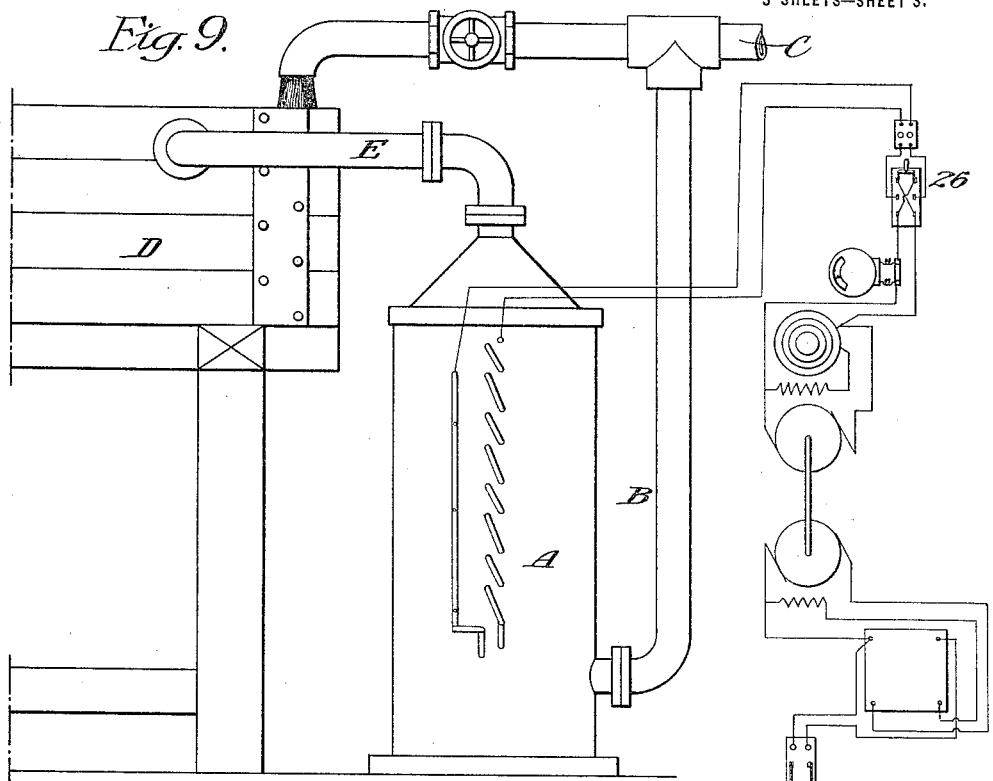
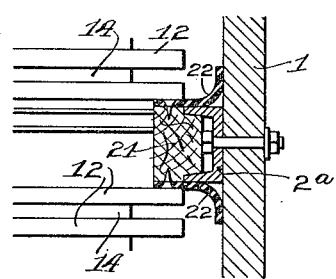
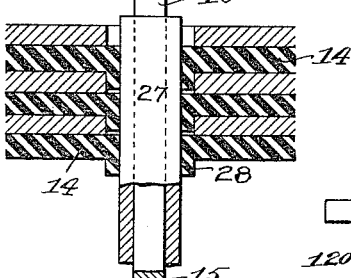
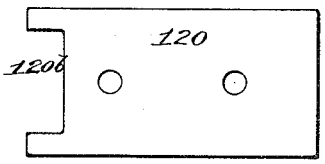

UNITED STATES PATENT OFFICE.

CLARENCE P. LANDRETH, OF PHILADELPHIA, PENNSYLVANIA.

PROCESS OF TREATING LIQUIDS.

1,146,942.   Specification of Letters Patent.   Patented July 20, 1915.

Application filed August 2, 1912. Serial No. 712,971.

*To all whom it may concern:*

Be it known that I, CLARENCE P. LANDRETH, a citizen of the United States, residing in Philadelphia, Pennsylvania, have invented an Improved Process of Treating Liquids, of which the following is a specification.

My invention relates to that treatment of liquids for various purposes which involves the employment of electricity with or without the use of chemical agents; such treatment being principally applicable and valuable for rendering contaminated water potable, or for rendering chemically objectionable water available for uses in the arts, and my improved process is applicable for the treatment of raw water from ordinary water-courses as well as the treatment of waste water and other liquids from various factories and industrial establishments, and the liquid content of sewage.

One object of my invention is to render water potable or available for various uses in the arts for which purpose, in its contaminated condition, it could not be used; while a further object is to purify and render available for other uses contaminated liquids of various characters.

The process forming the subject of my invention may be carried out in various forms of apparatus, in all of which a plurality of electrodes are arranged in separate banks or sets suitably connected and insulated so that in the case of wear or breakage or the short circuiting or any accident occurring in one bank or set, the plates comprising such bank or set are thereby cut out of circuit or otherwise disposed of without interfering with the operation of the apparatus and the process involved. With my improved apparatus I provide means for keeping the electrodes in a proper electrical condition, and for agitating the water or other liquid under treatment whereby movement of the same independently of the force of its flow may be imparted thereto. At the surface of the electrodes under the action of an electric current, there is what is known as surface tension and this offers resistance.

My improved process includes provision for mechanical agitation of the liquid adjacent the electrodes independently of its flow, and this thorough agitation increases the efficiency of the process and reduces the electrical cost.

These and other features of my invention are more fully and particularly pointed out hereinafter, reference being had to the accompanying drawings showing one form of apparatus capable of carrying out my improved process, in which:

Figure 1, is a view in elevation, partly in section, of a treating apparatus; Fig. 2, is a sectional plan view on the line 2—2, Fig. 1; Fig. 3, is a perspective view of the cap plate or cover of the apparatus; Fig. 4, is a perspective view of the base or bottom of the apparatus; Figs. 5 and 6, are perspective views of plates or electrodes which I may employ; Fig. 7, is a sectional view illustrating a form of closure interposed between the banks or sets of electrodes; Fig. 8, is a sectional view of the electrodes, the rotating elements between the same and protective means for the shaft driving said elements; Fig. 9, is a diagrammatic view illustrating the use of my improved apparatus for treating electrically a small body of liquid by-passed from a larger body, which larger body is subsequently acted upon by the electrically treated portion of the liquid; Fig. 10, is a sectional view illustrating electrodes of modified form; Fig. 11, is a plan view of one of the electrodes shown in Fig. 10; Fig. 12, is a view illustrating the means for supporting the electrodes, and Figs. 13 and 14, are sectional views illustrating the electrical connections for the plates.

In the present instance, the side walls 1 are of wood, preferably of considerable thickness, suitably braced by cross-bars 2, and bolted together by bolts 3, so as to insure strength and rigidity, while a cover plate or door 4 is also secured by bolting; one set of bolts having additional sections 3ª for securing said door in place and permitting removal of the same. The structure is also provided with angle corner pieces 5 which serve to stiffen the structure vertically. A top or cap plate 6, and a bottom or base plate 7, preferably of metal, have recessed edges 8, to receive the side walls of the inclosing structure; packing 9 being preferably interposed between the bottom of said recesses and said wooden side walls. The top and bottom plates 6 and 7 are provided with corner lugs 10 suitably apertured at 10ª for the reception and attachment of adjustable tension bolts 11 whereby the wooden-walled casing may be rigidly confined between said top and bottom plates. Contained within the casing are a plurality of banks or series of electrodes 12, and the arrangement of these electrodes is substantially the same as that illustrated in my Patent No. 1,095,893, of May 5, 1914; the present plates being oblong in shape and substantially filling the cross sectional area of the casing. To provide for the proper passage and circulation of liquid between the plates, alternate plates are provided with apertures 12ª, which may be centrally disposed, while the others have their corners removed at 12ᵇ, as clearly indicated in Figs. 5 and 6. I do not desire to be limited to such form of plates or electrodes, however, and in Fig. 10, I have shown an arrangement of electrodes in which the top and bottom plate or electrode 120 of each set, shown in Fig. 11, is so arranged as to cause the liquid to flow from side to side of the casing, the other plates 120ª disposed between said upper and lower plates being somewhat shorter so as to provide the necessary space for the passage of liquid in its flow from side to side of the apparatus; passing in one direction between the several plates or electrodes, and in another direction above and below the banks of same. The plates 120 are cut away as indicated at 120ᵇ. The plates are suitably secured together in sets or banks, as in the structure of my former application, and each set or bank is independently supported by suitable rails 13 carried by the side walls of the casing, as hereinafter described.

The apparatus is provided with rotating members 14 disposed between the plates or electrodes and designed to agitate the liquid between and adjacent to said plates; said members being driven by shafts 15. These shafts are preferably arranged in short sections which may be connected together by suitable couplings comprising sectional blocks 16, recessed or apertured to receive the shaft ends and connected together by bolts 17.

The casing of the structure being of wood, it is necessary to provide means that will insure the closing of the same by the door 4 at one side or the other, as may be most convenient or desirable. In order to permit the employment of wood or similar material for the door, it is essential that the same be braced, and such bracing, which is generally in the form of pieces of channel or angle iron 2ª, requires space within the casing. To insure that the door when set up will be in proper relation to the banks of electrodes and to avoid contact of said metal bracing elements with the electrodes, I provide cover pieces of wood 21 or other insulating material for said braces 2 which, with the cover pieces, lie in the spaces between the respective banks or electrodes and out of the way of the same.

To insure travel of the liquid undergoing treatment in contact with the plates or electrodes and to avoid any short circuiting of the flow of the water or other liquid which might take place by reason of its contact with said metal braces, the spaces adjacent the door have flaps or valves 22 which are carried by said wooden cover pieces 21 and overlie the said plates in such manner to insure that the pressure of the liquid will keep them closed. While this arrangement leaves pockets adjacent the sides of the plates or electrodes receiving small bodies of liquid, these bodies are constantly changing and therefore do not impair the efficiency of the apparatus. The valves 22 serve also as packing means, and the described construction is particularly desirable inasmuch as I employ packing in the form of an elastic gasket 23 between the door and the casing, and space must be left for compression of said gasket when the door is finally closed liquid tight.

In the use of the rails 13 upon which the plates rest, provision must be made for the accommodation of nuts 24 of spacing bolts or tie rods 25 connecting the plates 12 together. To this end said rails, which are preferably in the form of channel pieces to add stiffness and strength to the structure, have angle pieces 13ª secured to their upper flanges, which angle pieces form upwardly projecting supporting ledges a slight distance inward from the walls of the casing.

The banks of electrodes are entirely independent and separable from each other, and each set of rotating members 14 of each bank has an independent shaft polygonal in shape; a square shaft being preferred, and the shafts of adjoining banks are connected together by the box couplings before referred to, which couplings are readily separable when it is desired to withdraw from the casing any bank of electrodes. By independently supporting each bank or set of electrodes by the rails 13, 13ª, any one may be removed without affecting the others.

I employ banks of electrodes comprising suitable plates which, during the operation of the apparatus, are alternately positive and negative, depending upon the direction of the current, and these plates are spaced apart for the reception of the members 14 carried by the shaft 15 to which movement is imparted by suitable means whereby said members may be rotated with respect to the plates. The plates are apertured for the passage of the shaft and for the disposition of the hubs of the paddles; the preferred construction being illustrated in the enlarged sectional view, Fig. 8.

The electrodes employed are of different polarity; the plates of one polarity alternating with plates of the opposite polarity, and disposed in the circuit leading from the source of electrical energy is a suitable pole-changing switch 26 whereby the current may be so directed that one set of plates act as cathodes for a certain length of time, while the other set of plates act as anodes during the same period of time, and then by changing the poles, the anodes become the cathodes, and the cathodes (of the former condition) become the anodes.

The members 14 disposed between the respective plates serve the purpose of agitating the water or other liquid being treated independently of its flow and will on the one hand remove the bubbles of gas forming on the plates, and on the other hand distribute or carry away into the flowing water or other liquid any deposit loosened from the plates by virtue of the change in polarity and prevent accumulation of foreign matter.

In practice, owing to the danger of electrolytic corrosion, it is not practicable to employ a shaft of corrodible metal unless the same be protected directly adjacent the plates. I have found, however, that shafts of any metal liable to destruction under ordinary conditions may be fully protected by casing the shaft with aluminum or suitable insulating material so that I am enabled to employ a suitable metal for the shaft having the desired strength and yet prevent destruction of the same. The shaft casing indicated at 27 preferably follows the contour of the shaft, and the elements 14 are mounted upon this shaft casing, said elements having hubs 28 depending therefrom to a point directly adjacent to and substantially in contact with the next lower element, thereby affording additional insulation for the sleeve or protective casing, as clearly illustrated in Fig. 8.

The electrodes employed in this particular form of the apparatus may be of carbon, or of suitable metals, such as mild steel, aluminum, copper, manganese, etc.

The apparatus forming the subject of my invention may be employed in two ways. It may be employed as the sole means of treating all of the water or other liquid from any source which may require treatment in order to render it potable or commercially available for a desired purpose. In such instance, a certain proportion of hydroxid will be formed in the volume of liquid passing through the machine when the electrodes are of suitable metals, which volume of course must vary when the apparatuses are of different capacities, and as the character of the water or other liquid under treatment varies, so will the amount of current necessary and the consequent precipitate of hydroxid vary. I have discovered, however, that instead of passing the entire volume of liquid to be treated through the apparatus, I may, in many instances economically by-pass a certain and much smaller amount of the same through the apparatus and introduce such by-passed liquid into the main volume of liquid, thus by an increase of the current delivered I can develop a greater quantity of hydroxid in the smaller body of water treated in the apparatus so that the total volume of hydroxid in the liquid delivered by the apparatus will be sufficient to treat all of the predetermined quantity of liquid whether coming through the apparatus or the main volume; such treatment taking place in a suitable receptacle outside the apparatus. For instance, if liquid passing through the apparatus requires two (2) amperes to develop the desired proportion of hydroxid, it will be readily understood that if I by-pass ninety per cent. (90%) of the liquid and only pass ten per cent. (10%) through the apparatus; the ninety per cent. (90%) and the ten (10%) subsequently commingling, that the apparatus must deliver ten (10) times the quantity of hydroxid that would be present in the whole volume of liquid passing through the apparatus alone, and if two (2) amperes be sufficient to produce the desired treatment of liquid passing through the apparatus alone, it will be readily understood that ten (10) times that quantity will be necessary to produce the extra quantity of hydroxid required. In Fig. 9, therefore, I have shown means for carrying out this part of my invention, in which apparatus for electrically treating liquid is indicated at A, and receives via a pipe B a certain portion of the whole body of liquid to be treated entering from the main C, which main also delivers directly to the final treating receptacle D. The bypassed liquid after its electrical and chemical treatment in the chamber A passes via a pipe E to the receptacle D for action upon the greater volume of untreated liquid within the same received directly from the main C. It will be understood, of course, that the treating chamber A and its operation is of a character precisely similar to that illustrated in Fig. 1. I have also discovered in treating waters for boiler and other softening purposes containing scale forming matter in solution that the effect of the current in an insulated container is to affect the particles in solution; rendering them unusually chemically active. In view of this condition, I may inject, by suitable means, such for instance as a pump, any suitable chemical reagent, such as lime, which may be delivered to the treating chamber at the point 30. In such instance, one of the upper sets of electrodes may be cut out of circuit and serve as baffle plates, causing a thorough commingling of the reagent and the electrolyzed particles of the treated water while contained within the insulated casing. This causes a precipitation of the scale forming materials previously in suspension. By means of the hydroxid furnished from the electrically active plates, quick sedimentation or filtration is rendered possible, and the liquid may be separated from the suspended matter, flocculent and otherwise, produced by the chemical and electrical treatment, in any suitable manner.

As most waters requiring treatment are good conductors, it has heretofore been found necessary when using the usual current available to insert resistance, causing a loss of electrical energy. To avoid this and make the apparatus self-contained, I may extend the driving shaft from an operating motor 31 through the base of the apparatus and connect therewith a suitable generator 32, and by means of a rheostat 33 I am enabled to govern the current delivered according to the needs and the varying conductivities of the waters to be treated.

In my improved apparatus, the plates of each polarity may be connected together by bolts 35 and 36; binding posts 37 and 38, respectively, being attached to these bolts, as shown in Figs. 13 and 14. These bolts are in electrical contact with alternating plates, as indicated; the other plates of the different polarity being apertured for the reception of metallic collars 39 through which the bolts pass, which collars are in turn surrounded by insulating sleeves 40. The binding posts extend through the wall of the treating vessel, and the apertures for the same have insulated bushings 41, which in turn receive gland nuts 42, with suitable packing 43 surrounding said binding posts so as to insure against leakage at such points.

I have found in practice that the lower electrodes where the water first enters the apparatus are more readily disintegrated than the others, and in order to lessen the current density of the same, I parallel the two lower units or sections of electrodes within the treating chamber (not shown), thereby halving the current density as compared with the others which may be in series.

In some instances I may prefer to pass the electric current through the various sets of plates in series, so that in the case of short circuiting owing to the breaking down of any insulation or from any other cause in any of the sets of plates, the treatment is not materially changed as the remaining sets of plates will receive an increased quota of current, and further, the apparatus is not thereby rendered inefficient as would be the case in usual practice where the positive and negative plates are connected together in parallel.

Electrolytic action is due to the ampere flow in a circuit independent of the wattage, and the voltage, and therefore the wattage consumption, is governed by the resistance. Therefore, were I to use one (1) ampere in series, I would gain in efficiency as many times one (1) ampere as I have sets of plates in series. This enables me to treat water with a very low amperage output. Wattage is dependent upon the conductivity of the liquid treated and the distance between the plates, but the treatment is dependent upon the amperage.

In the operation of my apparatus, I find that a precipitate in the ferrous condition is frequently present, particularly if the quantity of electricity present is greater than that required for efficient treatment of the water. I find, therefore, that by using more current than usually necessary for such purpose and lessening the volume and flow of the water, a large portion of iron precipitate in a ferrous condition is discharged by my apparatus, and if introduced into a larger body of untreated water, the same results will be produced as if I use a much larger apparatus and the same current, and this effect is particularly valuable in the production of hydroxid alone to get the germicidal and filtration effects desired without the introduction of a chemical reagent in the form of alum, sulfate of iron, hypochlorite of lime, etc., part of which is liable to be retained by the water after filtration.

The rotating agitating elements perform several important functions. On the one hand they keep the plates and apparatus in proper working condition, free from the accumulation of clogging substances and gas bubbles tending to cause polarization, and on the other hand they perform the important function of breaking up the surface tension and causing a thorough contacting of all impurities present in the liquid under treatment with the electrodes. As action takes place at the point of contact of the plates only, it is necessary that all portions of the water or other liquid being treated be brought in contact with the plates in the shortest space of time. The repeated treatment of a small volume of water between the first set of plates assisted by the agitation of the rotating paddles insures the necessary contact and is essential to the rapid treatment of liquids where such contact is necessary.

I claim:

1. The process of treating liquids to produce a precipitant including foreign matter to be removed therefrom, which consists in causing the liquid to flow under pressure in contact with and between electrodes connected in circuit with a source of electrical energy whereby decomposition is effected, agitating the liquid adjacent said electrodes whereby motion independently of the force of its flow is imparted thereto, said agitating means maintaining the conducting surfaces of the electrodes in proper electrical condition for action upon fresh bodies of the flowing liquid, and introducing a precipitating agent into the liquid after it has passed said electrodes.

2. The process of treating liquids to produce a precipitant including foreign matter to be removed therefrom which consists in causing the liquid to continuously flow under pressure in contact with and between electrodes connected in circuit with a source of electrical energy whereby decomposition is effected, agitating the liquid adjacent the electrodes whereby motion independently of the force of its flow is imparted thereto, said agitating means maintaining the conducting surfaces of the electrodes in proper electrical condition for action upon fresh bodies of the flowing liquid, and introducing a chemical reagent into the liquid after it has passed said electrodes.

3. The process of treating liquids to produce a precipitant including foreign matter to be removed therefrom, which consists in causing such liquid to flow in contact with and between electrodes connected in circuit with a source of electrical energy whereby decomposition is effected, causing the liquid to be diverted across the surface of said electrodes, mechanically agitating the liquid in its passage across the electrodes whereby motion independently of the force of its flow is imparted thereto; said agitating means serving to maintain the conducting surfaces of the electrodes in proper electrical condition for action upon fresh bodies of the flowing liquid, introducing a chemical precipitating agent into the liquid after it has passed said electrodes, and finally separating the liquid from the suspended matter, flocculent and otherwise, produced by the chemical and electrical treatment.

4. The process of treating liquids to produce a precipitant including foreign matter to be removed therefrom, which consists in passing the same continuously through a substantially closed vessel forming part of a conduit and in contact with oxidizable electrodes connected in circuit with a source of electric current whereby a coagulating body is electrolytically formed, mechanically agitating such liquid adjacent said electrodes whereby motion independently of the force of its flow is imparted thereto and the electrodes swept of precipitating bodies attaching thereto, and then commingling the electrically treated liquid with large bodies of other liquid exterior of the treating vessel.

5. The process of treating given quantities of water to produce a precipitant including foreign matter to be removed therefrom, which consists in passing the same to a suitable receptable or settling tank, passing another portion of such water to a substantially closed vessel forming part of a conduit and in which it is caused to continuously flow under pressure in contact with oxidizable electrodes connected in circuit with a source of electric current whereby a coagulating body is electrolytically formed, mechanically agitating such water adjacent said electrodes whereby motion independently of the force of its flow is imparted thereto and the electrodes cleaned of precipitating bodies attaching thereto, introducing a chemical agent to said electrically treated water prior to its discharge from the treating vessel, and then commingling the two bodies of water; the electrically and chemically treated water carrying an excess of the reagents formed and sufficient for treating the amount of water in the settling tank.

6. The process of treating liquids to produce a precipitant including foreign matter to be removed therefrom, which consists in causing the liquid to flow continuously under pressure in contact with electrodes connected in circuit with a source of electrical energy whereby decomposition is effected, agitating the liquid adjacent said electrodes whereby motion independently of the force of its flow is imparted thereto, said agitating means removing the bubbles of gas collecting at the electrodes due to the electrical action whereby the surface tension is relieved, and finally introducing a precipitating agent into the flowing liquid after it has passed said electrodes.

In testimony whereof, I have signed my name to this specification, in the presence of two subscribing witnesses.

CLARENCE P. LANDRETH.

Witnesses:
MURRAY C. BOYER,
WM. A. BARR.

Copies of this patent may be obtained for five cents each, by addressing the "Commissioner of Patents, Washington, D. C."